United States Patent [19]

Oldendorf et al.

[11] Patent Number: 4,898,253

[45] Date of Patent: Feb. 6, 1990

[54] ELECTRONIC BALANCE FOR DOSING

[75] Inventors: Christian Oldendorf, Göttingen; Franz-Josef Melcher, Hardegsen; Christoph Berg, Göttingen, all of Fed. Rep. of Germany

[73] Assignee: Sartorius GmbH, Fed. Rep. of Germany

[21] Appl. No.: 358,090

[22] Filed: May 30, 1989

[30] Foreign Application Priority Data

Jun. 4, 1988 [DE] Fed. Rep. of Germany ....... 3819075

[51] Int. Cl.$^4$ .................... G01G 19/62; G01G 23/37
[52] U.S. Cl. .................... 177/25.13; 177/177
[58] Field of Search .................... 177/177, 178, 25.13

[56] References Cited

U.S. PATENT DOCUMENTS

| | | | |
|---|---|---|---|
| 4,554,988 | 11/1985 | Ludwig et al. | 177/178 |
| 4,650,014 | 3/1987 | Oldendorf et al. | 177/177 |
| 4,694,922 | 9/1987 | Mairot | 177/178 |

Primary Examiner—George H. Miller, Jr.
Attorney, Agent, or Firm—Eric P. Schellin

[57] ABSTRACT

An electronic balance for dosing, with a measured value receiver, a digital signal processing unit, a digital entry keyboard for entering the theoretical value of a dosing, with a theoretical-weight memory and with a digital display unit with several positions after the decimal point, that switching means are present which determine the highest-value decade in which a number in the display is not equal to zero and that these switching means regulate the decoding of the display in such a manner that all zeros to the left of this decade up to the units decade are represented as a small zero "o" whereas prezeros in the 10 decade, 100 decade, etc. are entirely suppressed in a known manner. This makes possible a quasi-analog representation of the measured value which is attained in the units decade, the 10 decade, the 100 decade, etc. by means of the known suppression of prezeros even in the case of balance displays with positions after the decimal point.

2 Claims, 2 Drawing Sheets

ELECTRONIC BALANCE FOR DOSING

BACKGROUND OF THE INVENTION

The invention relates to an electronic balance.

Balances of this type are generally known and described e.g. in DE-OS No. 35 40 749. In it, the theoretical value is entered via the input keyboard for dosing and is stored in the theoretical-weight memory. The digital signal processing unit subtracts this theoretical value from the current measured value so that the dosing begins with the negative theoretical value and ends at zero.

It is also known from DE-OS No. 37 35 733 that prezeros can be suppressed in the display, that is, for example, in the case of a 3,000 g balance and a display value of 43.7 g, the zero in the 100 g decade, the 1,000 g decade and in the 10,000 are suppressed. This suppressing of prezeros has the advantage when dosing the manner indicated above that as the value zero is approached, that is, the final value of the dosing, the approach to the value zero becomes visible in a quasi-analog manner by means of the disappearance first of the numbers in the 10,000 g decade, than in the 1,000 g decade, then in the 100 g decade and finally in the 10 g decade without the operator having to consciously read off any numbers. However, this quasi-analog representation of the measured value does not function in the case of displays with several positions after the decimal point since the prezeros can not be suppressed in a simple manner in the 0.1 g decade, the 0.01 g decade, etc.

The invention therefore relates to an electronic balance of the initially mentioned type in such a manner that a quasi-analog representation of the measured value is also possible in the range of the positions after the decimal point.

SUMMARY OF THE INVENTION

Prezeros in the range of the positions after the decimal point and in the units or one decade are therefore represented as a small zero "o" instead of the generally customary large zero "0". This gives then only one-half the height of the customary numbers and the result is again a quasi-analog representation of the measured value.

In an advantageous further development of the invention the switching means are activated only if a theoretical value has been inputted into the theoretical-weight memory and if the sign in the display is negative. This quasi-analog representation of the measured value is therewith only activated when dosing from the negative theoretical value to zero and the exceeding of the theoretical weight i.e. display of positive values, is re-emphasized in addition to the sign change by the shifting of all prezeros from "o" to "0".

BRIEF DESCRIPTION OF THE INVENTION

The invention is described in the following with reference made to the schematic Figures.

FIG. 2 shows the display during dosing.

FIG. 4 shows the display of the second embodiment according to FIG. 3 in the vicinity of the zero point.

DETAILED DESCRIPTION OF THE INVENTION

Figure 1:
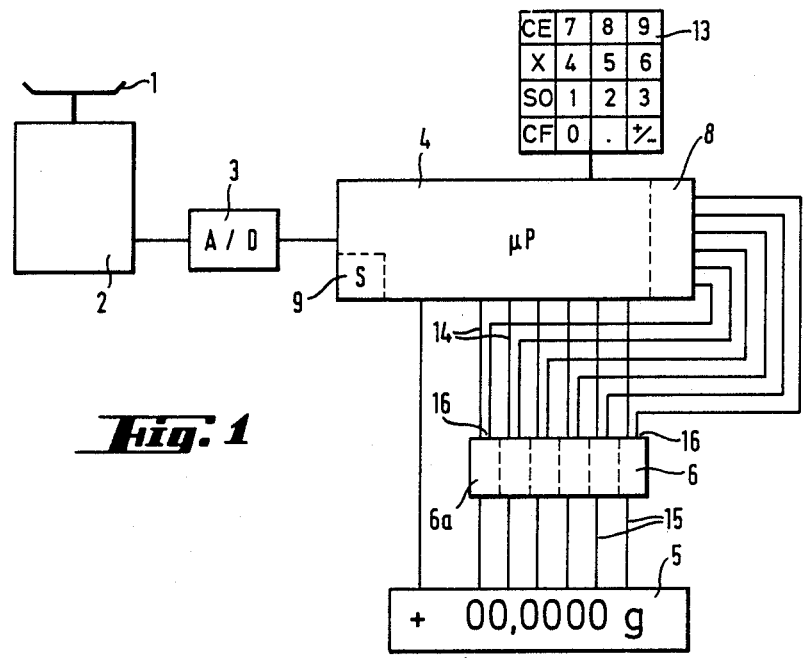
FIG. 1 shows a block diagram of the electronic balance in a first embodiment.

In the block diagram in FIG. 1, measured-value receiver 2 of the balance with balance scale 1 is indicated only schematically since it is not necessary for an understanding of the invention to provide greater details. The output signal of the measured value receiver is digitized in analog-digital converter and then supplied to digital signal processing unit 4. The digital signal processing unit can be e.g. a microprocessor. The theoretical value is entered via input keyboard 13 into digital signal processing unit 4 and stored in theoretical-value memory 9 within digital signal processing unit 4. During dosing, this value is subtracted in theoretical memory 9 from the current measured value of measured value receiver 2 and the result is displayed in digital display 5. Decoding unit 6 is located between digital signal processing unit 4 and digital display 5, which decoding unit recodes the magnitude of the internal representation in the digital signal processing unit 4 to be displayed (e.g. BCD code) to the display representation (e.g. 7-segment code). The data is supplied to decoding unit 6 via leads 14 and the recoded result supplied via leads 15 to display 5. Furthermore, decoding unit 6 comprises additional control inputs 16 which are important for the decoding of the number zero: Without a signal on control input 16, the decoder converts the number zero into the customary representation "0". If a signal is in control input 16, decoder 6a for the 10 decade converts the zero into an empty display (no segment activated). This results in prezero suppression. The remaining decades of decoder 6 convert the zero into the symbol "o" at the presence of a signal on the corresponding control input 16.

Switching member 8 within digital signal processing unit 4 assumes the control of control inputs 16. It is determined in this switching member 8 which the highest-value decade is in which a number is not equal to zero; then, no signal is outputted for control inputs 16 for this decade and for all other decades located to the right whereas a control signal is outputted for all decades located further to the left.

Therefore, according to the examples shown in FIG. 2, no signal is put on any of control inputs 16 at a display value of 28,000 g since the 10 g decade is the highest-value decade in which a number is not equal to zero. At the display value of 5.3102 g, the 1 g decade is the highest-value decade in which a number is not equal to zero, so that a signal is put only on control input 16 of the 10 g decade; this brings about the suppression of the zero in the 10 g decade. At display value 0.2407 g, the 0.1 g decade is the highest-value decade in which a number is not equal to zero, so that a signal is put in control input 16 of the 10 g decade and of the 1 g decade; this brings about the suppression of the zero in the 10 g decade and in the 1 g decade the representation of zero as "o". At display value 0.0083 g, the 0.001 g decade is the highest-value decade in which a number is not equal to zero, so that a signal is put in control input 16 of the 0.01 g decade and of all decades located further to the left; this brings about the suppression of the zero in the 10 g decade and the representation of zero as "o" in the 1 g decade, the 0.1 g decade and the 0.01 g decade. The last example in FIG. 2 with a display value of 0.0006 g results in a logical fashion.

Thus, at a dosing of e.g. 28,000 g, this value first appears with a negative sign in the display. As substance is gradually dosed in, the negative value displayed gradually decreases and the examples collectively shown in FIG. 2 are arbitrarily selected intermediate states of the dosing and the last value of −0.0006 g represents almost the final point of the dosing. It is apparent that the progression of the dosing is represented in a quasi-analog manner first by the elimination of the 10 g decade and then at the 1 g decade and the decades located further to the right by the passage from the full-size numbers to the only half-height "o".

Figure 3:
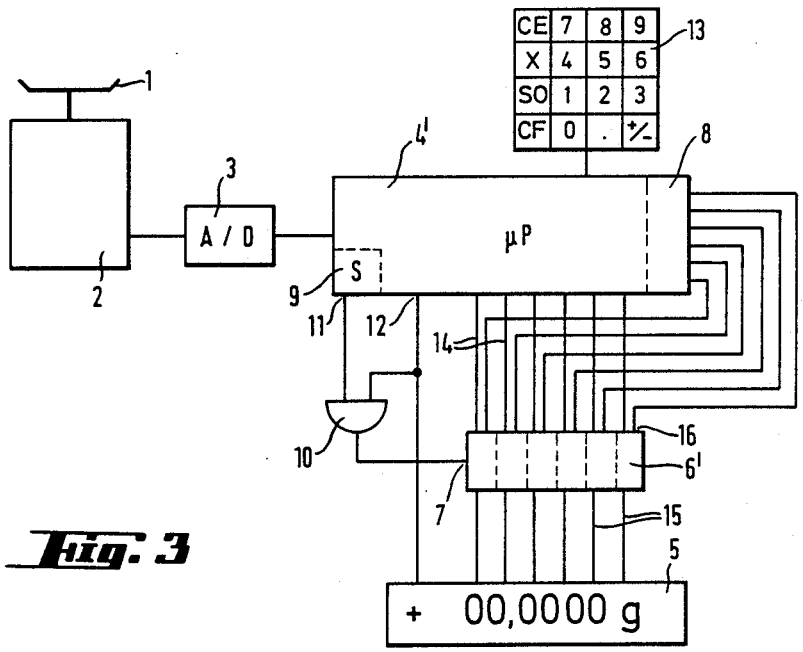
FIG. 3 shows a block diagram of the electronic balance in a second embodiment.

FIG. 3 shows a second embodiment of the circuit. The circuit parts which are the same as in FIG. 1 are designated by the same reference numbers. This second embodiment differs only by the additional AND gate 10, which receives a signal at its two inputs if a signal for the minus sign in digital display 6 is in output 12 of digital signal processing unit 4' and if the occupancy of theoretical-weight memory 9 is signaled in output 11. There is an output signal in input 7 of decoding circuit 6' only if both signals are present on AND gate 10. This input 7 is an additional actuating input for control inputs 16; a signal in control input 16 does not become effective in this embodiment until a signal is also in input 7. This has the consequence that the prezeros are only represented as "o" if, firstly, the theoretical value memory is occupied by a weight value to be dosed and, secondly, if the display value is negative. As a result, the representation of the result takes place in the customary form if the balance is not being used for dosing or if positive values are displayed.

The display of positive values in the customary form with large zeros "0" results once again, in addition to the sign, in a distinguishing of positive and negative values in the display. This is advantageous during dosing, since the attention of the operator at the end of the dosing is on the decades all the way to the right and the sign, which is far to the left, can be easily overlooked. The end of a dosing and the beginning of overfilling is shown in FIG. 4. At first, 0.0002 g theoretical weight are still lacking, then only 0.0001 g; in the third example, the theoretical value has been attained and in the following examples 0.0001 g and 0.0002 g have been overdosed. The operator thus recognizes the attainment of the theoretical value and the beginning of overfilling not only by the sign all the way to the left but also by the switching from the small zero "o" to the large zero "0", which is immediately adjacent to the last decade on which the attention is focused.

Decoder 6 and gate 10 have been sketched and described above as separate components for the sake of clarity. They can naturally, just as the other functions of digital signal processing unit 4, 4', also be realized by appropriate program orders within digital signal processing unit 4, 4'.

What is claimed is:

1. An electronic balance for dosing, with a measured value receiver (2), a digital signal processing unit (4,4'), a digital entry keyboard (13) for entering the theoretical value of a dosing, with a theoretical-weight memory (9) and with a digital display unit (5) with several positions after the decimal point, characterized in that switching means (8) are present which determine the highest-value decade in which a number in the display (5) is not equal to zero and that these switching means (8) regulate the decoding (6) of the display in such a manner that all zeros to the left of this decade up to the units decade are represented as a small zero "o" whereas prezeros in the 10 decade, 100 decade, etc. are entirely suppressed in a known manner.

2. The electronic balance for dosing according to claim 1, wherein the switching means (8) is only activated if a theoretical weight has been entered into the theoretical-weight memory (9) and if the sign in the display (5) is negative.

* * * * *